(12) United States Patent
Liu et al.

(10) Patent No.: US 7,668,463 B2
(45) Date of Patent: Feb. 23, 2010

(54) METHOD AND APPARATUS FOR GENERATING AND TRANSMITTING WDM MWOF SIGNALS

(75) Inventors: Xiang Liu, Marlboro, NJ (US); Carsten Metz, Township of Chatham, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 509 days.

(21) Appl. No.: 11/367,119

(22) Filed: Mar. 3, 2006

(65) Prior Publication Data

US 2007/0206950 A1    Sep. 6, 2007

(51) Int. Cl.
*H04B 10/00* (2006.01)
(52) U.S. Cl. ............... 398/115; 398/68; 398/72; 398/59; 370/328; 370/338; 370/277; 455/422.1; 455/445
(58) Field of Classification Search ............ 398/66, 398/67, 68, 69, 70, 71, 72, 79, 59, 60, 115, 398/116, 117, 118, 119, 135, 126, 136, 138, 398/182, 183, 202, 208, 207, 214; 370/328, 370/338, 278, 329, 277; 455/422, 445, 422.1
See application file for complete search history.

(56) References Cited

U.S. PATENT DOCUMENTS

| | | | | |
|---|---|---|---|---|
| 5,349,463 A | * | 9/1994 | Hirohashi et al. | 398/126 |
| 5,880,863 A | * | 3/1999 | Rideout et al. | 398/59 |
| 6,560,213 B1 | * | 5/2003 | Izadpanah et al. | 370/338 |
| 7,013,087 B2 | * | 3/2006 | Suzuki et al. | 398/115 |
| 7,409,159 B2 | * | 8/2008 | Izadpanah | 398/96 |
| 2002/0012495 A1 | * | 1/2002 | Sasai et al. | 385/24 |

OTHER PUBLICATIONS

Data Sheet, United Monolithic Semiconductors, CHU3277, Ref. DSCHU3277391, Apr. 1, 2003.

J. Yu et al., "Seamless Integration of WDM-PON and Wideband Radio-Over-Fiber for 8×2.5Gb/s All-Optical Up-Conversion Using Raman-Assisted FWM," 2005 European Conference on Optical Communication (ECOC'05), paper Mo4.3.5, Glasgow, Scotland.

J. Yu et al., "A Novel Optical Frontend for Ultra-High Capacity of 32×2.5Gbit/s Data Delivery inRadio-over-Fiber Systems," 2005 European Conference on Optical Communication (ECOC'05), post-deadline paper Th4.5.4, Glasgow, Scotland.

* cited by examiner

*Primary Examiner*—Hanh Phan
(74) *Attorney, Agent, or Firm*—Wall & Tong, LLP

(57) ABSTRACT

The present invention includes method and apparatus for converting optical signals to MWOF signals for transmission to wireless data, audio and/or video terminals in the W-band. Advantageously, there is no need to maintain expensive and complex remote stations because a centralized station performs all the complex processing.

20 Claims, 5 Drawing Sheets

100

200

300

400

500

METHOD AND APPARATUS FOR GENERATING AND TRANSMITTING WDM MWOF SIGNALS

TECHNICAL FIELD

The invention relates to the field of optical telecommunications, and more particularly, to the generation and transmission of wireless access wavelength division multiplexing (WDM) millimeter-wave-on-fiber (MWOF) signals for high-speed wireless access applications.

BACKGROUND OF THE INVENTION

Radio-over-fiber (ROF), particularly millimeter-wave-over-fiber (MWOF), is a technology useful for broadband wireless access applications. MWOF offers several advantages over conventional broadband wireless access systems including greater information capacity, wider coverage area, less complex hardware in remote stations and better immunity to radio interference.

Increasing the carrier frequency of the MWOF signals to beyond 50 GHz is difficult due to the bandwidth limitation of common electro-optical modulators and optical to electrical (O/E) converters.

SUMMARY OF THE INVENTION

The present invention improves upon the prior art by increasing the carrier frequency of millimeter-wave-over-fiber (MWOF) signals up to the W-band, e.g. 75-110 GHz, for high-speed wireless access applications. The carrier frequency can be increased, in accordance with an embodiment of the invention, by doubling the frequency of a MWOF signal using a frequency doubling circuit at a remote station thereby the resulting signal is in the W-band. Advantageously, this allows for structurally simpler remote stations and more efficient use of the spectrum for point-to-multi point applications.

In one embodiment, the present invention provides a method that includes receiving a plurality of millimeter-wave-over-fiber (MWOF) optical signals. The MWOF signals are filtered to extract therefrom an optical signal representing a desired channel. The extracted optical signal is converted to an electrical signal. The converted signal is filtered to obtain a filtered signal having a millimeter-wave carrier frequency. The carrier frequency of the filtered signal is frequency doubled to obtain an electrical signal in the W-band such that the W-band electrical signal being adapted for wireless transmission.

DETAILED DESCRIPTION

The invention is primarily described within the context of generating and transmitting wireless access wavelength division multiplexing (WDM) millimeter-wave-on-fiber (MWOF) signals for high-speed wireless access applications. However, those skilled in the art and informed by the teachings herein will realize that the invention is also applicable to any apparatus and method that involves wireless access applications in a communication network.

Figure 1:
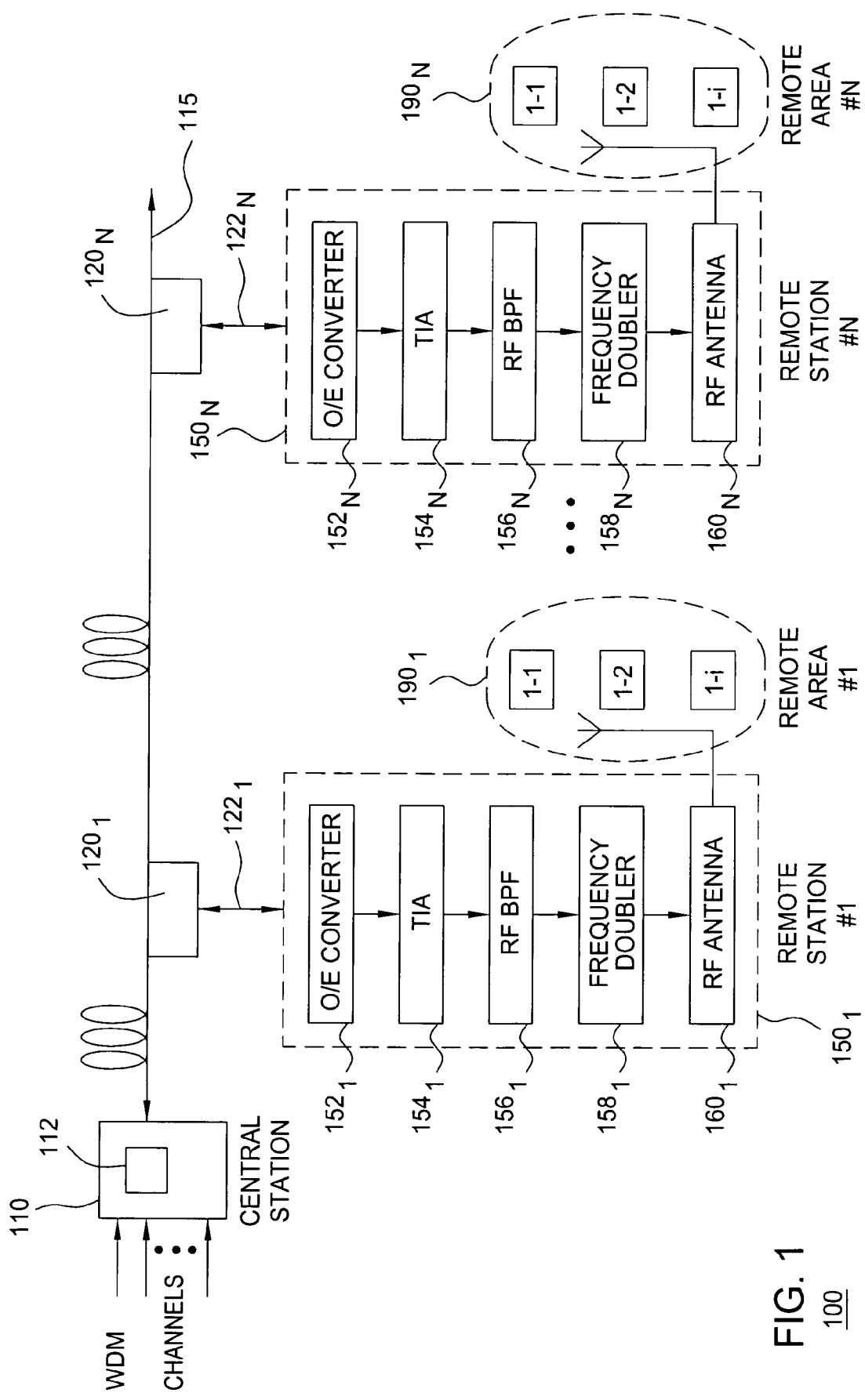
FIG. 1 depicts a high-level block diagram of an optical communication system according to one embodiment of the present invention.

FIG. 1 depicts a high-level block diagram of an optical communications system according to one embodiment of the present invention. The optical communications system 100 includes a central station 110, a long-haul optical fiber 115, optical filters $120_1$ through $120_N$, distribution optical fibers $122_1$ through $122_N$, remote base stations $150_1$ through $150_N$, remote areas $190_1$ through $190_N$, and terminal devices 1-1 through 1-i for each remote area 190.

The central station 110 receives optical signal that carry high-speed data for distribution to up to N different remote areas, i.e., $190_1$ through $190_N$, where N is a positive integer. The farthest remote area is located as far away as many miles from the central station 110. The central station 110 includes a WDM MWOF signal generator 112. In one embodiment, the signal generator 112 is based on a polarization-insensitive optical modulator as described in FIG. 3 below. In another embodiment, the signal generator 112 is based on a parametric amplifier as described in FIG. 4 below. Other types of signal generators may also be used.

The central station 110 receives one or more optical signals, such as multiple channels in WDM optical signals or single channel optical signal. The optical signal(s) received by the central station are transmitted at conventional speeds up to 2.5 Gb/s. The central station 110 receives optical signals having OOK modulation scheme from a source (not shown). In one embodiment, the source is an optical fiber network. Other sources of high-speed data with other types of modulation schemes are also possible. The central station 110 and remote stations 150 are connected by the long-haul fiber 115. Additional remote stations (not shown) in other remote areas (not shown) are also connected to the long-haul fiber and are structurally similar to remote station $150_1$.

The central station 110 has a signal generator 112 having a modulation circuit to modulate onto the illustratively 2.5 Gb/s optical signals a periodic intensity modulation having a frequency of about 38 GHz. The methods and arrangements to perform this up-conversion are described in J. Yu et al., "Seamless Integration of WDM-PON and Wideband Radio-Over-Fiber for 8×2.5 Gb/s All-Optical Up-conversion Using Raman-Assisted FWM," 2005 European Conference on Optical Communication (ECOC'05), paper Mo4.3.5, Glasgow, Scotland and J. Yu et al., "A Novel Optical Frontend for Ultra-high Capacity of 32×2.5 Gbit/s Data Delivery in Radio-over-fiber Systems," 2005 European Conference on Optical Communication (ECOC'05), post-deadline paper Th4.5.4, Glasgow, Scotland, herein incorporated by reference in their entireties. The intensity modulation is illustratively achieved by using a Mach-Zehnder modulator, which is biased at null and driven by a sinusoidal RF wave with a frequency of 19 GHz. Advantageously, the Mach-Zehnder modulator is an input-polarization insensitive. In another embodiment, optical signal 210 is a single channel or WDM signal. In one embodiment, the central station 110 imparts high-frequency intensity modulation in the millimeter wavelength range onto the OOK optical signals.

It is desirable to set the RF carrier frequency of the wireless signal in the upper-millimeter wave band, also known as the W-band, at 71 GHz to 76 GHz, 81 GHz to 86 GHz and 92 GHz to 95 GHz. A W-band RF carrier setting provides increased bandwidth allowing high-speed data transmission, e.g., multi-Gb/s. The W-band signal has very short wavelength. Therefore, W-band systems also permit the use of small antennas for high directivity. The short wavelength also allows for a more efficient use of the spectrum for point-to-multi point applications. Furthermore, automotive radar applications are already using the W-band. Thus, there exist extensive resources and mature monolithic microwave integrated circuit (MMIC) chips in the W-band frequency range.

In one embodiment, the capacity of a MWOF system is increased by a WDM arrangement of MWOF signals. One method to generate the WDM MWOF signals is by using an electro-optical modulator, as taught by Yu. Preferably, the electro-optical modulator is input-polarization insensitive so that different incoming optical signals, which generally have different polarization states, are simultaneously and effectively modulated to have a periodic intensity modulation at a frequency of about 38 GHz.

Figure 2:
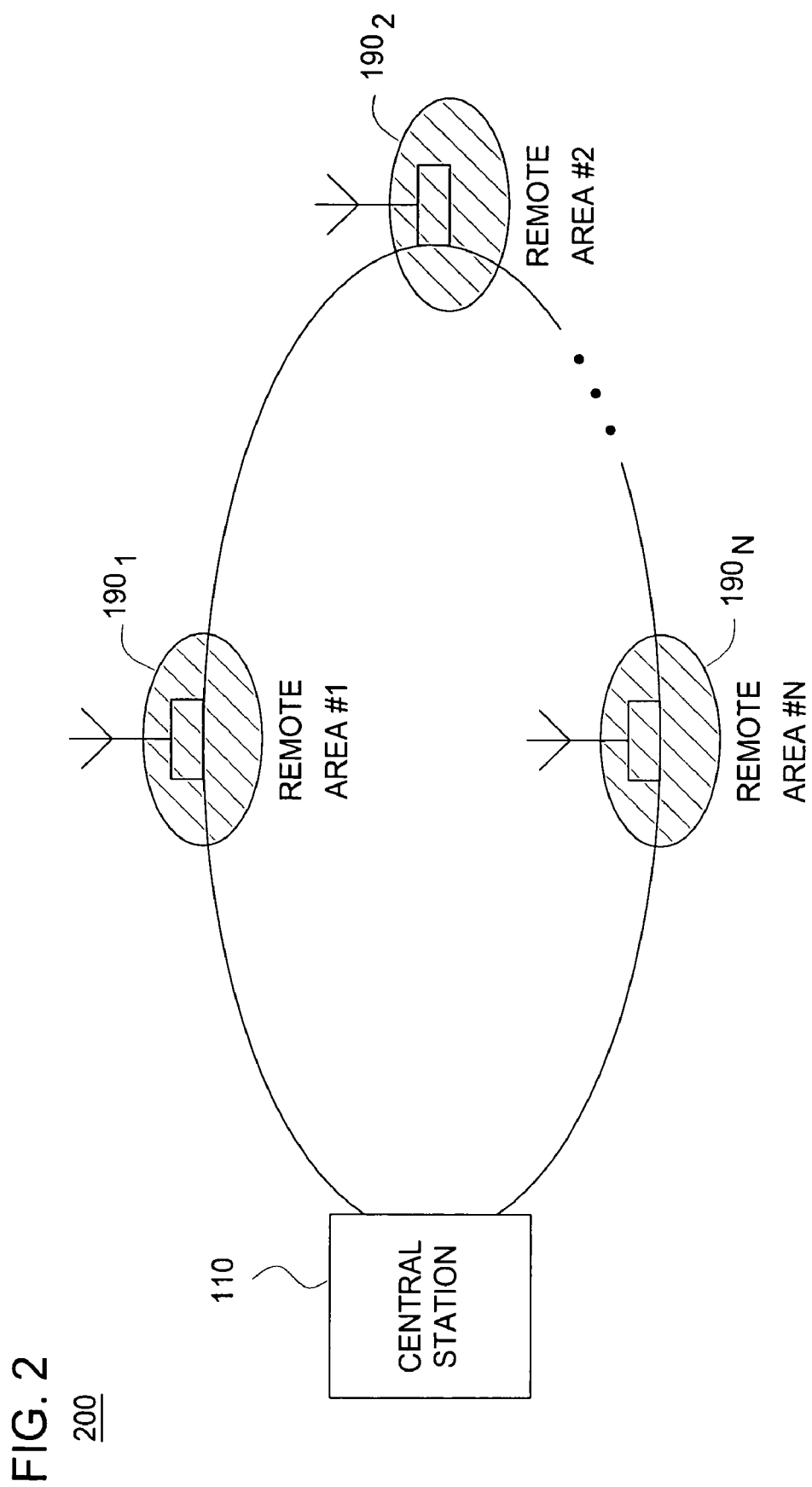
FIG. 2 depicts an exemplary ring configuration for bi-directional communication according to one embodiment of the present invention.

The long-haul fiber 115 connects the central station 110 to a plurality of different remote stations 150 through respective optical filters 120. The long-haul fiber includes a plurality of spans and dispersion compensation modules (not shown). The long-haul fiber 115 is an optical fiber for transmitting high-speed optical signals. In one embodiment, the optical fiber 115 is of a ring configuration in order to transmit information back to the central station 110 from remote stations, as illustrated in FIG. 2 below. In another embodiment, at least one connection fiber is bi-directional in order to transmit information back to the central station 110.

The optical filters 120 selectively allow certain channels to be received by the respective remote stations 150. In one embodiment, an optical filter 120 is a wavelength-selective filter such as a wavelength tunable filter. In another embodiment, the optical filter 120 is an optical coupler or splitter. In one embodiment, the optical filter 120 uses a 3 dB coupler to pass the desired wavelengths. In another embodiment, the remote station 150 receives multiple channels. In a further embodiment, the optical filter is an array waveguide grating (AWG). In another embodiment, the optical filter is a three-port optical filter with one input port and two output ports, one output port filters out the desired wavelength channel and other output port passes the remaining wavelength channels. In yet another embodiment, the filter is a four-port optical filter with two input ports and two input ports. The additional input port allows the remote station to re-use the wavelength that is dropped by the same filter for transmitting data back to the central station 110, when a fiber ring is used to connect the central station and the remote stations, as illustrated in FIG. 2 below. Other optical filter that blocks unwanted channels also may be used.

The remote stations 150 receive the filtered optical signals from the central station 110 through the long-haul fiber 115 and optical filters 120, respectively. Each remote station operates in a similar manner. The remote station 150$_1$ includes an optical-to-electrical (O/E) converter 152, a transimpedance amplifier (TIA) 154, a RF band pass filter (BPF) 156, a frequency doubler 158 and a radio frequency (RF) antenna 160.

In one embodiment, the O/E converter 152 is a 40 GHz optical-to-electrical converter operable to change an optical signal to a corresponding electrical up to 40 GHz. The TIA is a 40 GHz TIA. The TIA speeds up the response time of a current to voltage converter, while keeping the gain of the amplifier high. Other types of amplifiers may also be used. After conversion and amplification, a RF band pass filter (BPF) 156 filters out the data content carried by the RF carrier at approximately 38 GHz. The components of the converters and TIA are well known in the area of automotive technologies.

The filtered millimeter RF signal is frequency doubled by the frequency doubler 158 to a W-band signal with carrier frequency in the 76 GHz range. In one embodiment, the frequency doubling circuit is a United Monolithic Semiconductors (UMS), CHU 3277. UMS has its commercial headquarter in Orsay, France. Other commercially available frequency doublers within the appropriate RF frequency range may be used. Frequency doubling circuits are well known in the art of automotive technologies.

RF antenna 280 receives the W-band signal from the frequency doubling circuit 158$_1$ and wirelessly transmits the W-band signal toward the destined terminals over the air. In one embodiment, another TIA is used to boost the RF power before transmission by the antenna 280.

The present invention reduces the complexity of the remote stations by, for example, not requiring the generation of an accurate carrier clock and clock data recovery. The components of the remote stations do not need to include complex and expensive digital components. Furthermore, the bandwidth need for the modulator at the central station 110 and converters with TIA 165 is reduced because of the use of the frequency doubler 158. Note that at each remote station, the millimeter carrier is obtained automatically upon the photo detection.

Remote areas 190 are illustratively wireless distribution cells having corresponding remote stations 150. In one embodiment, one or more of the remote areas is a wireless video distribution cell. In another embodiment, one or more of the remote areas is a wireless data communication cell. In a further embodiment, one or more of the remote area is a mobile communication cell. The present invention provides a seamless integration of millimeter-wave-over-fiber transmission and the upper-millimeter-wave or W-band wireless communication system.

For the downlink, a frequency doubling circuit is used, in each remote station, to double the carrier frequency of the MWOF signal, e.g. in the range of 35~48 GHz, to the W-band frequency range, before transmission of the wireless communication to the end users 190. For the up-link, the end users send W-band signals back to its remote station, where the W-band signals are down-converted to a base-band signal by removing the carrier frequency. A frequency mixer (not shown) may realize this down-conversion. Since the speed of the base-band signal is much lower, it is easily and cost-effectively sent back to the central station, e.g., through direct modulation of a laser. Each end user down-converts its respective received signal by using a frequency mixer to obtain the base-band signal.

This arrangement of up-link and downlink reduces the cost of the network by centralizing most of the processing and allows the remote stations to be more manageable by reducing power consumptions and requiring fewer expensive components. For example, clock data recovery and digital signal processing are not necessary in the remote stations in the present invention. High-accuracy high-frequency carrier frequency generators are also not necessary in the remote stations in the present invention.

FIG. 2 depicts a ring configuration for bi-directional communication according to one embodiment of the present invention. The ring configuration includes the central station 110 and N remote areas, i.e., 190$_1$, 190$_2$, and so on through 190$_N$, where N is an integer greater than 1.

The WDM MWOF signal from the central station 110 carries channels containing information destined for all the remote areas connected to the ring in either a clockwise or counter-clockwise direction. The information destined for remote area #1 190$_1$ is selected by the corresponding optical filter for that area by filtering for its channel. Then, the optical filter for remote area #2 selects the information destined for remote area #2 by filtering for its channel. Remote area by remote area, the optical filter for each area selects for the channel having the information carried by the WDM MWOF destined for its area. After the final channel is dropped at remote area #N 190$_N$, the central station transmits another WDM MWOF signal containing the next set of information. In another embodiment, the signal travels in the counter-clockwise direction and the channels are filtered at their respective remote areas from remote area #N to remote area #1, respectively.

Figure 3:
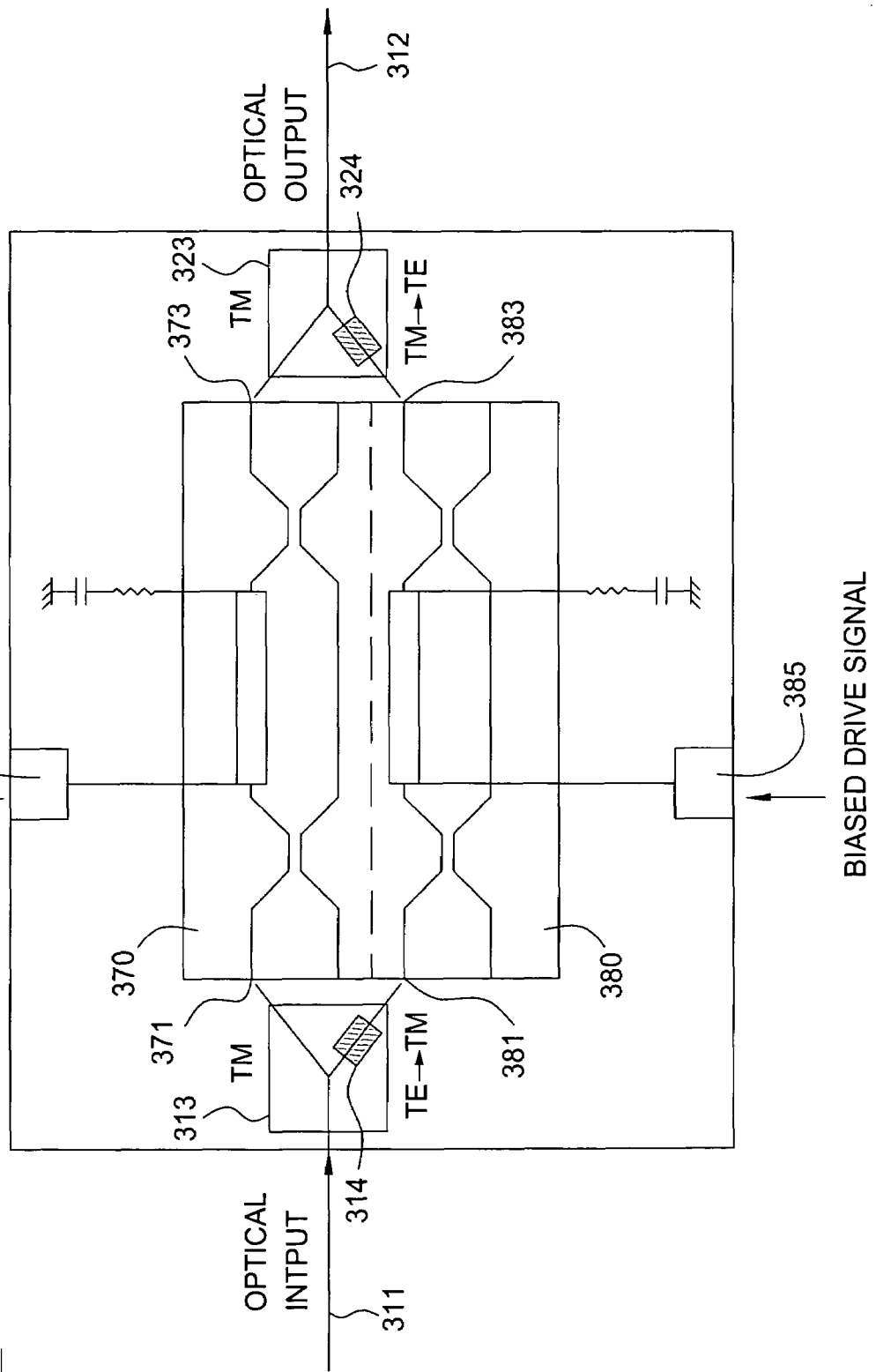
FIG. 3 depicts a high-level block diagram of a WDM MWOF source based on a polarization-insensitive optical modulator according to one embodiment of the present invention.

FIG. 3 depicts a block diagram of a WDM MWOF source 300 based on a polarization-insensitive optical modulator according to one embodiment of the present invention. The source 300 includes a splitter 313, a first electro-optical modulator 370, a second electro-optical modulator 380, and a combiner 323.

The splitter 313 receives an optical signal 311 and splits the optical signal into the transverse magnetic (TM) component and the transverse electric (TE) component. The TE component is converted to a corresponding TM component using a converter 314. In one embodiment, the converter 314 is a half wave plate. Other converters for converting TE to TM can be used. This conversion is appropriate where the source 300 is fabricated on a compact single wafer, and the wafer has only TM mode.

The first modulator 370 has four ports. The unconverted TM component from the splitter 313 is received by a first port 371. The first modulator 370 includes bias port 375 for receiving a biased drive signal. In one embodiment, the modulator is biased at null and the drive signal is a sinusoid RF wave at a frequency of about 19 GHz. In another embodiment, the modulator is biased at its quadrature point and the drive signal is a sinusoid RF wave at a frequency of about 38 GHz. The modulator may be a LiNbO3 modulator, or the modulator may be based on semiconductors. After modulating the unconverted TM component, the modulated component is transmitted to the combiner 323 through an output port 373.

The second modulator 380 has four ports and is structurally similar to the first modulator 370. The converted TM component from splitter 313 is received by a port 381. The second modulator 380 includes bias port 385 for receiving a biased drive signal. After modulating the converted TM component, the modulated converted TM component is transmitted to the combiner 323 through an output port 383.

The combiner 323 recombines the TM component of the signal with the TE component. The combiner 323 receives the modulated TM component from a port 373 of the first modulator 370. The combiner 323 also receives the converted modulated TM component from the output port 383 of the second modulator 380. The converted modulated TM component from port 383 is converted back to its corresponding TE component by converter 324. The converted modulated TE component is combined with the modulated TM component to form a millimeter-wave modulated optical output signal 312 for transmitting over the fiber 115.

Figure 4:
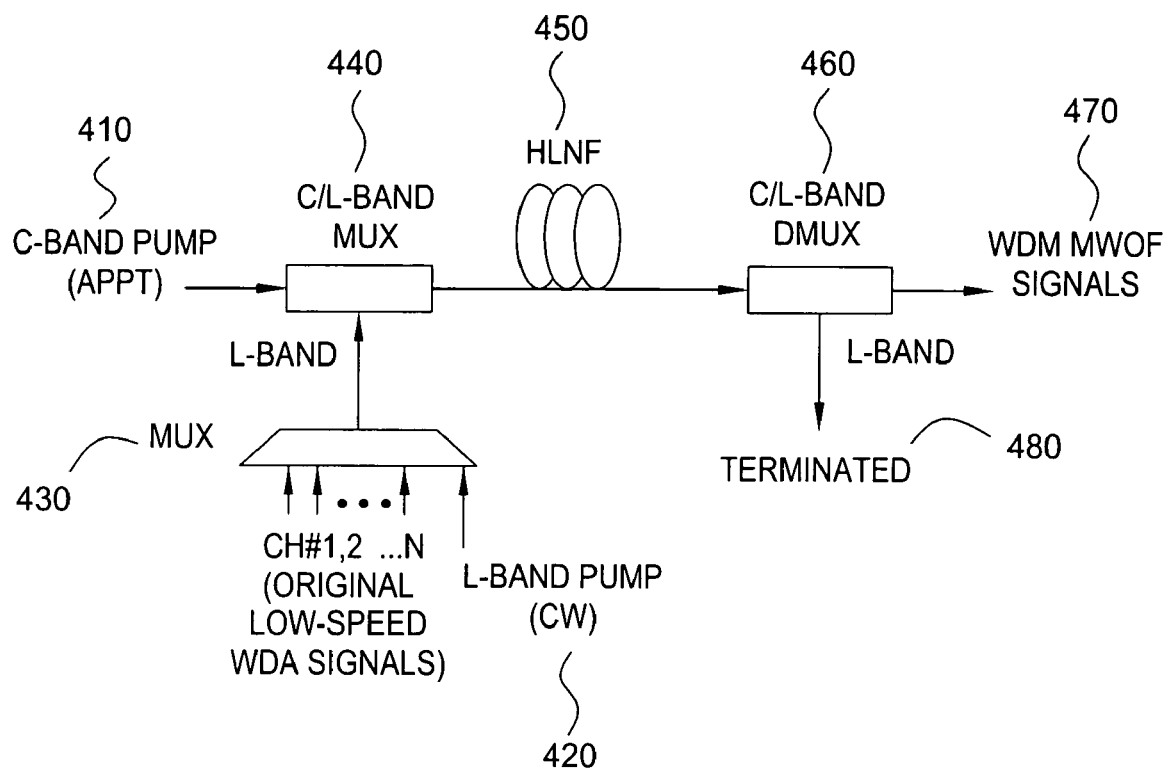
FIG. 4 depicts a high-level block diagram of a WDM MWOF source based on a parametric amplifier according to one embodiment of the present invention.

FIG. 4 depicts a block diagram of a WDM MWOF source 400 based on a parametric amplifier (PA) according to one embodiment of the present invention. This source is based on a four-wave-mixing (FWM) process in a parametric amplifier (PA), in which the original low-speed WDM signals are mixed with an alternate-phase pulse train (APPT). The source 400 includes a C-band pump 410, an L-band pump 420, a channel multiplexer 430, a C/L-band multiplexer 440, a highly non-linear fiber (HNLF) 450, and a C/L-band demultiplexer 360.

The C-band pump 410 produces a pulse train for generating WDM MWOF signals. In one embodiment, pump 410 has a repetition rate corresponding to the frequency of the millimeter wave, e.g., in the range of 40~60 GHz. In another embodiment, the pulse train conforms to an APPT with conventional optical frequency range. The APPT is generated by a common carrier-suppressed return-to-zero (CSRZ) approach through a Mach-Zehnder modulator.

The L-band pump 420 is a laser whose frequency is in the L-band. The laser signal includes a carrier wave. In one embodiment, the carrier wave is about 19 GHz.

The multiplexer 430 multiplexes transmitted data from the central station 110 with the carrier wave from the L-band pump to up-convert the data into the L-band. In one embodiment, the transmitted data includes low-speed WDM signals (e.g., at 2.5 Gb/s) from a conventional optical network.

The C/L multiplexer multiplexes the wavelengths of the C-band pump pulse train with the L-band pump having the carrier frequency and the transmitted data. The C/L multiplexer produces a multiplexed C/L band signal for transmission on the HLNF 350 where FWM process occurs.

The HLNF 450, using the physical characteristics of the fiber and the FWM process, produces a compact optical spectrum. In one embodiment, the HNLF 450 has a length of 1 km, a zero-dispersion wavelength (ZDW) of 1560 nm, a dispersion slope of 0.2 ps/nm2/km, and a nonlinear coefficient of 10/W/km. The power of each pump is 15 dBm and the signal power is 5 dBm/ch. The stimulated Brillouin scattering (SBS) threshold of the 1 km HNLF is about 7 dBm. Since the SBS bandwidth for silica fiber is about 17 MHz, the CW pump linewidth is broadened to beyond 100 MHz in order to effectively suppress the SBS. The L-band pump wavelength is at approximately 1548 nm, and the C-band pump wavelength is at approximately 1572 nm. Four low speed WDM signals at 2.5 Gb/s are in non-return-to-zero (NRZ) on-off-keying (OOK) format, and are spaced by approximately 300 GHz (or 2.4 nm).

Compared to a conventional two-pump PA design using two alternate-phase pulse trains (APPTs) as the pumps, the present invention offers smaller crosstalk among the generated WDM MWOF signals, and high tolerance of the generated signals to fiber chromatic dispersion. This is because each of the generated signals has a more compact optical spectrum. The depicted embodiment also simplifies the design of the WDM MWOF source by requiring only one APPT instead of two APPTs.

Figure 5:
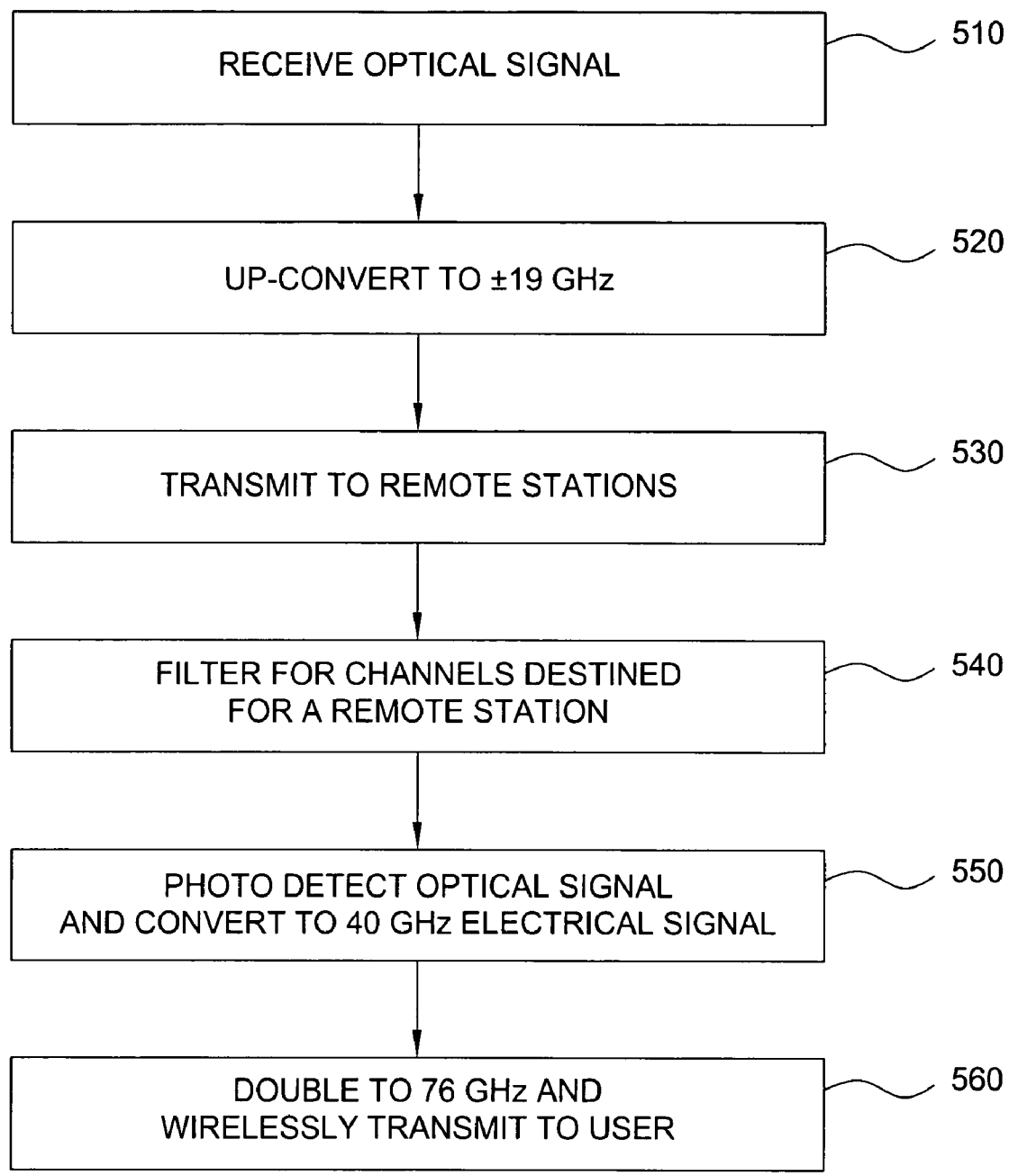
FIG. 5 illustrates a flow chart according to one embodiment of the present invention.

FIG. 5 illustrates a flow chart according to one embodiment of the present invention.

At step 510, the central station 110 receives an optical signal as described above in FIG. 1. In one embodiment, the signal includes one channel. In another embodiment, the signal includes a plurality of channels. In a further embodiment, the signal is a WDM signal. In one embodiment, the optical signal is being transmitted at 2.5 Gb/s. In another embodiment, the optical signal is transmitted at a conventional transmission speed less than 2.5 Gb/s. The optical signal is modulated by any known modulation schemes such as OOK, PSK, etc.

At step 520, the received optical signal is modulated to have periodic intensity modulation with a frequency of approximately 38 GHz. In one embodiment, the central station 110 performs all the required functions of the "millimeter-wave" modulation of the received optical signal or the generation of the MWOF signals. By performing all the functions of modulation for all the wavelength channels at a central location, no complex circuitry is necessary at the remote stations.

At step 530, the central station 110 transmits the MWOF signal to the remote station 120. In one embodiment, the MWOF signal includes all the optical signals being transmitted by the remote stations. The structural arrangement allows the more expensive and process intensive signal processing to be performed centrally by the central station 110.

At step 540, the remote station filters the received MWOF signal for the desired channels. In one embodiment, the station receives a filtered signal within a WDM signal. In another embodiment, the filtered signal is a single channel optical signal.

At step 550, the filtered optical signal is detected by an O/E converter. The detected signal is then amplified. In one embodiment, a TIA amplifies the detected signal. Then, the detected signal is filtered by the RF BPF to select the RF information carried by the millimeter-wave carrier. The millimeter-wave carrier is at approximately 38 GHz.

At step 560, a frequency doubling circuit doubles the millimeter-wave signal to a W-band signal with a carrier frequency of approximately 76 GHz. Having the information in the W-band, the signal is wireless transmitted to the terminal devices. In one embodiment, the terminal devices are high-speed data-delivery subscribers. In another embodiment, the terminal devices are video subscribers. Other types of terminal devices that receive wireless information in the W-band are possible for use with this system.

The invention provides several advantages. First, the use of MWOF signals allow larger coverage area of the remote stations because the signal attenuation in optical fiber is very low, approximately 0.2 dB/km, as compared to signal attenuation through the air. Second, the expense and complexity of remote stations are reduced because a centralized station performs much of the complex processing needed to affect the system, and multiple WDM channels share the cost of common equipment. Finally, the use of the frequency doubling circuit allows one to take the advantages offered by the W-band wireless communication with about half of the bandwidth requirements on the optical modulator and O/E converter.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
   receiving a plurality of millimeter-wave-over-fiber (MWOF) optical signals;
   filtering the MWOF signals to extract therefrom an optical signal representing a desired channel;
   converting the extracted optical signal to an electrical signal;
   filtering the converted signal to obtain a filtered signal having a millimeter-wave carrier frequency; and
   doubling the carrier frequency of the filtered signal to obtain an electrical signal in the W-band, the W-band electrical signal being adapted for wireless transmission.

2. The method of claim 1, wherein the MWOF optical signals carry data via on-off-keying (OOK).

3. The method of claim 1, wherein the MWOF optical signals multiplex data with speed up to approximately 2.5 Gb/s.

4. The method of claim 1, wherein the MWOF optical signals have a periodic intensity modulation at a frequency of approximately 38 GHz.

5. A wireless communications station, comprising:
   an optical filter, for filtering a plurality of millimeter-wave-over-fiber (MWOF) optical signals to extract therefrom an optical signal representing a desired channel;
   an optical-to-electrical (O/E) converter, for converting the extracted optical signal to an electrical signal;
   a band-pass filter (BPF), for filtering the O/E converted signal to obtain a pass-band signal having a millimeter-wave carrier frequency;
   a frequency doubling circuit, for doubling the carrier frequency of the pass-band signal to obtain an electrical signal in the W-band; and
   a radio frequency (RF) antenna, for wirelessly transmitting the W-band signal.

6. The station of claim 5, wherein the optical filter comprises a 3-port optical filter.

7. The station of claim 5, wherein the optical filter comprises a 4-port optical filter.

8. The station of claim 5, wherein the optical filter comprises a tunable optical filter.

9. The station of claim 5, wherein the optical filter comprises an arrayed waveguide grating (AWG) filter.

10. The station of claim 5, wherein the O/E converter has a bandwidth of approximately 40 GHz.

11. The station of claim 5, wherein the BPF has a bandwidth of approximately 5 GHz at a center frequency of approximately 38 GHz.

12. The station of claim 5, wherein the W-band electrical signal has a carrier frequency of approximately 76 GHz.

13. The station of claim 5, wherein the transmitted wireless signal has a carrier frequency of approximately 76 GHz.

14. The station of claim 5, wherein the O/E converted electrical signal is further amplified by a transimpedance amplifier (TIA).

15. The station of claim 5, wherein the station is coupled to a ring network.

16. The station of claim 5, wherein the station receives the MWOF signals from a central station comprising an electro-optical modulator for generating the MWOF signals by modulating a plurality of optical signals.

17. A wireless transmitter, comprising:
   means for optically filtering a plurality of millimeter-wave-over-fiber (MWOF) optical signals to extract therefrom an optical signal representing a desired channel;
   means for converting the extracted optical signal to an electrical signal;
   means for electrically filtering the converted electrical signal to obtain a pass-band signal whose carrier frequency is that of the millimeter-wave;
   means for doubling the carrier frequency of the pass-band signal to obtain an electrical signal in the W-band; and
   means for wirelessly transmitting the W-band signal to subscribers.

18. The transmitter of claim 17, wherein the MWOF signal is generated by modulating a plurality of optical signals through an electro-optical modulator.

19. The transmitter of claim 18, wherein the electro-optical modulator comprises a LiNbO3-based modulator.

20. The transmitter of claim 18, wherein the electro-optical modulator comprises an input-polarization independent modulator.

* * * * *

UNITED STATES PATENT AND TRADEMARK OFFICE
CERTIFICATE OF CORRECTION

PATENT NO. : 7,668,463 B2 Page 1 of 1
APPLICATION NO. : 11/367119
DATED : February 23, 2010
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 866 days.

Signed and Sealed this

Twenty-eighth Day of December, 2010

David J. Kappos
*Director of the United States Patent and Trademark Office*